United States Patent
Sutherland

(10) Patent No.: US 9,470,523 B2
(45) Date of Patent: Oct. 18, 2016

(54) APPARATUS AND METHODS FOR THE LAUNCH AND RECOVERY OF CRAFT FROM AND TO A HOST SHIP

(71) Applicant: BAE SYSTEMS plc, London (GB)

(72) Inventor: Craig Sutherland, Glasgow Strathclyde (GB)

( * ) Notice: Subject to any disclaimer, the term of this patent is extended or adjusted under 35 U.S.C. 154(b) by 235 days.

(21) Appl. No.: 14/190,287

(22) Filed: Feb. 26, 2014

(65) Prior Publication Data

US 2014/0338441 A1  Nov. 20, 2014

Related U.S. Application Data

(63) Continuation of application No. PCT/GB2012/052067, filed on Aug. 23, 2012.

(30) Foreign Application Priority Data

Aug. 26, 2011  (GB) .................................. 1114774.1

(51) Int. Cl.
*G01D 21/00* (2006.01)
*B63B 35/44* (2006.01)
*G01C 13/00* (2006.01)
*B63B 27/36* (2006.01)
*B63B 35/40* (2006.01)
*B63B 35/42* (2006.01)

(52) U.S. Cl.
CPC ............. *G01C 13/002* (2013.01); *B63B 27/36* (2013.01); *B63B 35/40* (2013.01); *B63B 35/42* (2013.01)

(58) Field of Classification Search
None
See application file for complete search history.

(56) References Cited

U.S. PATENT DOCUMENTS

| | | | |
|---|---|---|---|
| 3,934,530 A | 1/1976 | Kossa et al. | |
| 6,550,408 B1 | 4/2003 | Janssen | |
| 7,156,036 B2 * | 1/2007 | Seiple | B63B 27/36 114/254 |
| 7,296,528 B1 | 11/2007 | Doyle et al. | |
| 7,581,507 B2 * | 9/2009 | Kern | B63B 23/30 114/256 |
| 7,827,925 B2 * | 11/2010 | Hirayama | B63B 19/08 114/258 |
| 8,215,252 B1 * | 7/2012 | Chun | B63B 39/005 114/121 |

(Continued)

FOREIGN PATENT DOCUMENTS

| | | |
|---|---|---|
| DE | 4229706 A1 | 3/1994 |
| SE | 0202555 A | 2/2004 |
| WO | 2013030543 A1 | 3/2013 |

OTHER PUBLICATIONS

International Preliminary Report on Patentability and Written Opinion of the International Searching Authority for Patent Application No. PCT/GB2012/052067, mailed on Mar. 13, 2014, 5 pages.

(Continued)

*Primary Examiner* — Michael A Lyons
*Assistant Examiner* — Jermaine Jenkins
(74) *Attorney, Agent, or Firm* — Finch & Maloney PLLC

(57) ABSTRACT

A system and method for determining and displaying the suitability of water conditions in a zone for the launch or recovery of a smaller craft (10) from or to a host ship (12) is disclosed. The system and method detect one or more external environment parameters such as the height, direction and period of the swell, and one or more parameters relating to the ship operating conditions such as the heading, speed, pitch and roll angles, and processes these to determine the suitability of the conditions for launch or recovery.

20 Claims, 4 Drawing Sheets

(56) References Cited

U.S. PATENT DOCUMENTS

| | | | |
|---|---|---|---|
| 8,689,720 B2* | 4/2014 | Eide | B63B 35/003 114/258 |
| 8,770,125 B2* | 7/2014 | Guerrier | B63B 39/005 114/74 R |
| 2005/0251300 A1* | 11/2005 | Hellvik | G01F 23/14 701/21 |
| 2010/0000459 A1 | 1/2010 | Colangelo | |

OTHER PUBLICATIONS

International Search Report for Patent Application No. PCT/GB2012/052067, mailed on Feb. 12, 2013, 4 pages.

GB Intellectual Property Office Search Report under Section 17(5) for GB Patent Application No. 1114774.1, mailed Nov. 18, 2011, 3 pages.

* cited by examiner

APPARATUS AND METHODS FOR THE LAUNCH AND RECOVERY OF CRAFT FROM AND TO A HOST SHIP

This invention relates to apparatus and methods for the launch and recovery of craft from and to a host ship. In particular, but not exclusively, the invention relates to apparatus and methods for the launch and recovery from and to an amphibious warfare ship such as a landing platform dock (LPD) or a landing ship dock (LSD) of smaller craft such as landing craft utilities (LCU) or other boats or waterborne vehicles that are launched from and recovered to the host ship. Such amphibious warfare ships are provided with a well dock which is a hangar-like deck located near the waterline in the stern of the ship. By taking on water the ship can lower its stern, flooding the dock and allowing the smaller craft to dock and undock within the ship. This allows men and equipment to be transferred between the ship and the smaller craft for onward passage to the shore or other location away from the ship during amphibious operations. More broadly, the invention extends to many alternative types of launch and recovery and to many different types of craft. It extends therefore to, for example, the launch and recovery of small craft such as rigid inflatable boats (RIBs) from ships with stern ramps or stern doors over which the small craft is launched and recovered.

In naval operations it is desirable to launch or recover the smaller craft swiftly and with the minimum risk of damage to the craft or their contents. However, the conditions within the well dock can vary considerably, dependent on a number of factors which affect the sea state within the well dock, leading to sloshing and surging which make it difficult for the smaller craft to enter or exit the well dock. Also, the conditions between the well dock and the wake of host vessel can have a significant effect on the ease with which the smaller craft may be launched or recovered. Furthermore, with advances in modern warfare, particularly in over the horizon (OTH) operations, there is a need for the smaller craft to be capable of a greater range and to be lighter and faster than existing craft. In order to achieve reductions in weight, the smaller craft may be less robust than conventional craft and therefore it is important to know what needs to be done to control the ship to ensure that the conditions within the well dock are such that the smaller craft can be rapidly deployed, with a low risk of damage.

Accordingly, we have conducted extensive investigations and sea trials to determine how the conditions in the well dock are dependent on a range of contributing elements relating to the external environment and the ship's operation. From this we have designed an apparatus and method wherein data relating to various parameters that contribute to the conditions within and approaching the well dock are monitored to give a prediction of the conditions in the well dock which can then be displayed. This provides important advantages because it can provide advisory guidance for those responsible for deploying the smaller craft as to whether the conditions are favourable for docking or undocking as the case may be. Furthermore, the data so derived may be used to indicate the optimum conditions (such as heading and speed) of the host ship, given the relevant other ship and external conditions, to show what changes need to be made to the ship's operation to provide favourable conditions in the well dock. This may be particularly beneficial where the host ship is a landing platform dock (LPD) or a similar ship which carries not only smaller craft but also helicopters or other aircraft. On such ships, when deploying helicopters and smaller craft at the same time, the heading, speed etc of the host ship to provide optimum conditions for departure and arrival of the helicopters may be at odds with the conditions to provide optimal launch and recovery conditions for smaller craft. In general, for launch of helicopters, the host ship should bear slightly off head into wind to ensure a clean airflow over deck and at a speed to ensure the wind speed and relative direction over deck is within limits prescribed within the Ships Helicopter Operating Limits (SHOL) diagram, but the conditions for optimal launch and recovery of smaller craft may be quite different. Therefore, providing apparatus and method which indicate to the ship commander the optimum ship's operating conditions for launch and recovery of smaller craft will enable him to set conditions that are suited both to deployment of the helicopters and the smaller craft, where possible.

Furthermore, the apparatus and methods may be used in mission planning so that given forecasts of the sea and wind conditions in a particular region, the mission planner can determine preferred manoeuvres for the host ship when deploying smaller craft with or without deployment of helicopters.

Accordingly, in one aspect, this invention provides apparatus for providing an indication of the suitability of water conditions in a launch/recovery zone for launch or recovery of a smaller craft from or to a host ship, which apparatus comprises:

means for detecting one or more parameters relating to the external environment of the host ship selected from:
swell height
swell direction
swell period
means for detecting one or more parameters relating to the host ship, selected from:
current ship heading
current ship speed
ship pitch angle
ship roll angle, and
a processor for receiving the detected values and for providing a signal indicative of the suitability of the water conditions in said launch/recovery zone.

The terms host ship and smaller craft are used broadly to mean any larger marine vessel to and from which a smaller vessel is launched or recovered. The term launch/recovery zone is used to mean an area within or adjacent the host ship where the smaller craft may be launched or recovered. So, for example, this may be within the well dock itself, or where the host ship has a stern ramp or stern door, in the vicinity of or approaching the stern ramp or stern door. The term recovered is used broadly to cover operations where the smaller craft navigates into a docked position and where it is externally recovered. The terms swell direction and ship heading are true and absolute readings.

Advantageously, at least some of the detected values are compared with pre-stored limit values or ranges of values, beyond or outside which the water conditions in the launch/recovery zone are likely to be unsuitable for launch or recovery. The launch/recovery zone may be within the host ship itself or adjacent the host ship. Thus in a ship having a well dock the, or one of the launch recovery zones may be the well dock area. Alternatively, or additionally, the launch/recovery zone may be adjacent said host ship, with said processor being operable to provide an indication of the suitability of conditions in said launch/recovery zone.

The output may be provided in many forms, but given the typical applications it is preferable for the processor is operable to provide a two state output signal representing a 'GO' or 'NO GO' indication. This may conveniently be displayed on a display, for example as a green or red traffic light depending on the status. This provides important line of sight communication to the coxswain of the smaller craft and also to those in the vicinity of the launch/recovery zone. In addition to providing a 'GO' or 'NO GO' indication, the apparatus preferably also displays real time readings for the monitored parameters. For some parameters such as e.g. roll and pitch angle, it is preferred for the indicator to display a trace or the like showing the variation with time of the parameter over a period. Where a monitored parameter is displayed in any form, it is preferred for the display to indicate whether the parameter is within acceptable limits for ensuring suitable water conditions in the launch/recovery zone. Thus, the colour of the display symbols may change, or the symbols may flash.

As well as passively indicating the suitability of the water condition the apparatus may operate to provide advisory data indicating changes to ship operation that may be made to improve the water condition. Thus, said processor may operable to output data for display on said indicator representing a suggested heading for said host ship to provide beneficial conditions in said launch/recovery zone.

Additionally or alternatively, said processor may include means for determining a suggested minimum speed for the host ship which may be displayed.

In a particularly preferred arrangement, the processor detects at least some of the following parameters and provides a 'GO' indication if each of the parameters is within the associated acceptable range.

| Parameter | Acceptable range |
| --- | --- |
| Swell height | 0-1.8 m |
| Ship heading | ±60° relative to swell |
| Ship speed | 0-5 kts |
| Roll angle | ±1.0° |
| Pitch angle | ±0.5° |

The ranges given are for launch of craft from an LPD launching and recovering from a well dock. These ranges will vary according to the class of ship and the particular launch and recovery method.

In addition to providing real time or near real time technical data on the conditions in the launch/recovery zone, the invention may be extended to provide a prediction of the suitability of the conditions in the launch/recovery zone based on forecasted data.

Accordingly, in another aspect this invention provides apparatus for providing data representing a prediction of the suitability of water conditions for launch or recovery of a smaller craft from or to a host ship in a launch/recovery zone, which apparatus comprises:

means for inputting data representing one or more given parameters relating to the external environment of the host ship selected from:
swell height
swell direction
swell period
means for inputting data representing one or more given parameters relating to the operating conditions of the host ship, selected from:
current ship heading
current ship speed
ship pitch angle
ship roll angle a processor for receiving and processing said data from said input means and for providing a signal indicative of the predicted suitability of the conditions in said launch/recovery zone.

The invention also extends to a method for determining or predicting the suitability of the water conditions in a launch/recovery zone within or adjacent a host ship, which comprises monitoring and processing one or more parameters related to the external environment of the host ship selected from:
swell height
swell direction
swell period
and one or more parameters relative to the host ship selected from
current ship heading
current ship speed
ship pitch angle
ship roll angle
to provide an indication of the suitability of the water conditions in said launch/recovery zone dependent upon said monitoring and comparison.

Whilst the invention has been described above it extends to any inventive combination of the features set out above or in the following description, claims or drawings.

The invention may be performed in various ways, and a specific embodiment thereof will now be described by way of example only, reference being made to the accompanying drawings in which.

Figure 1:
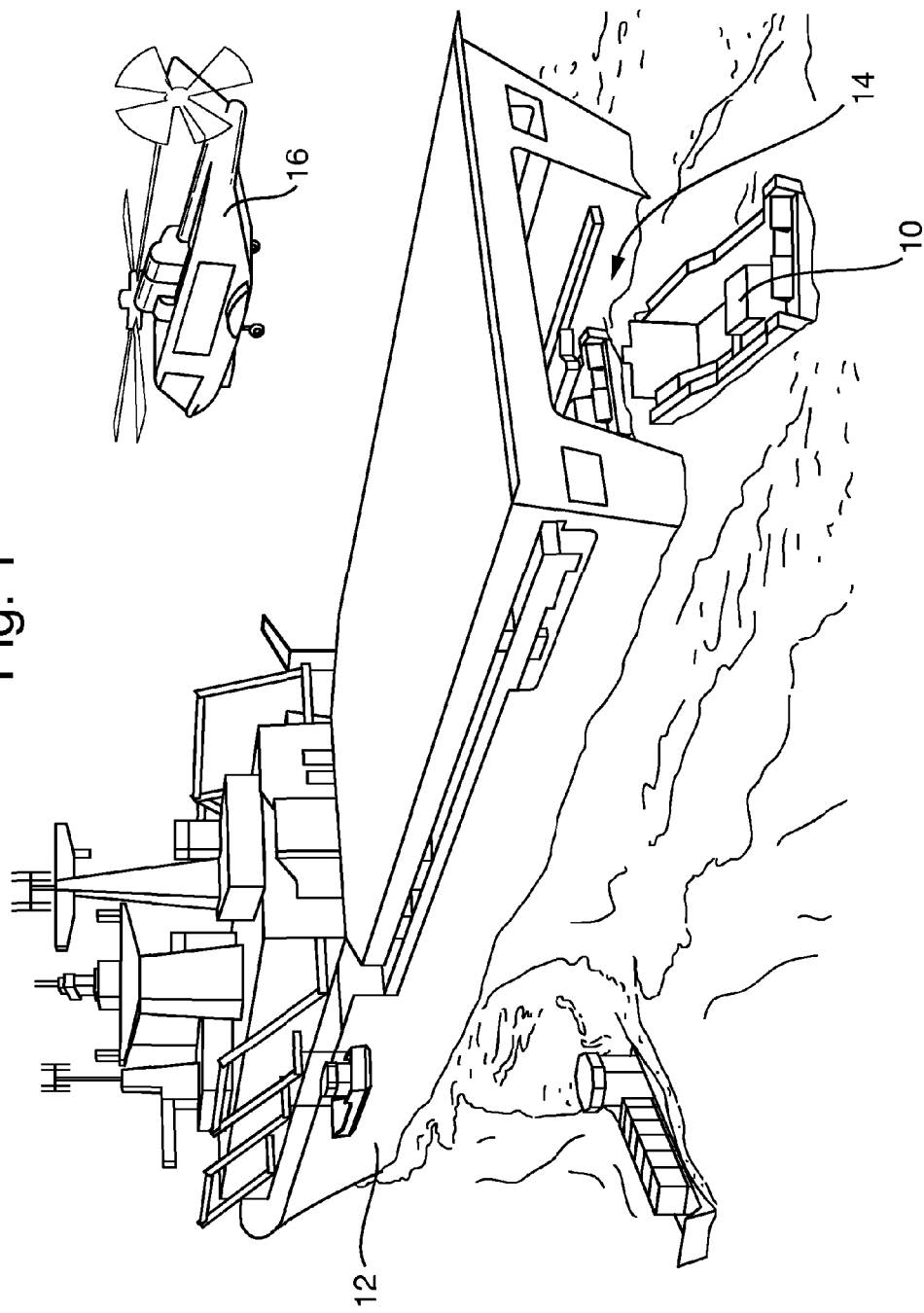
FIG. 1 is a schematic view of a host vessel in the form of a landing platform dock (LPD)
Figure 2:
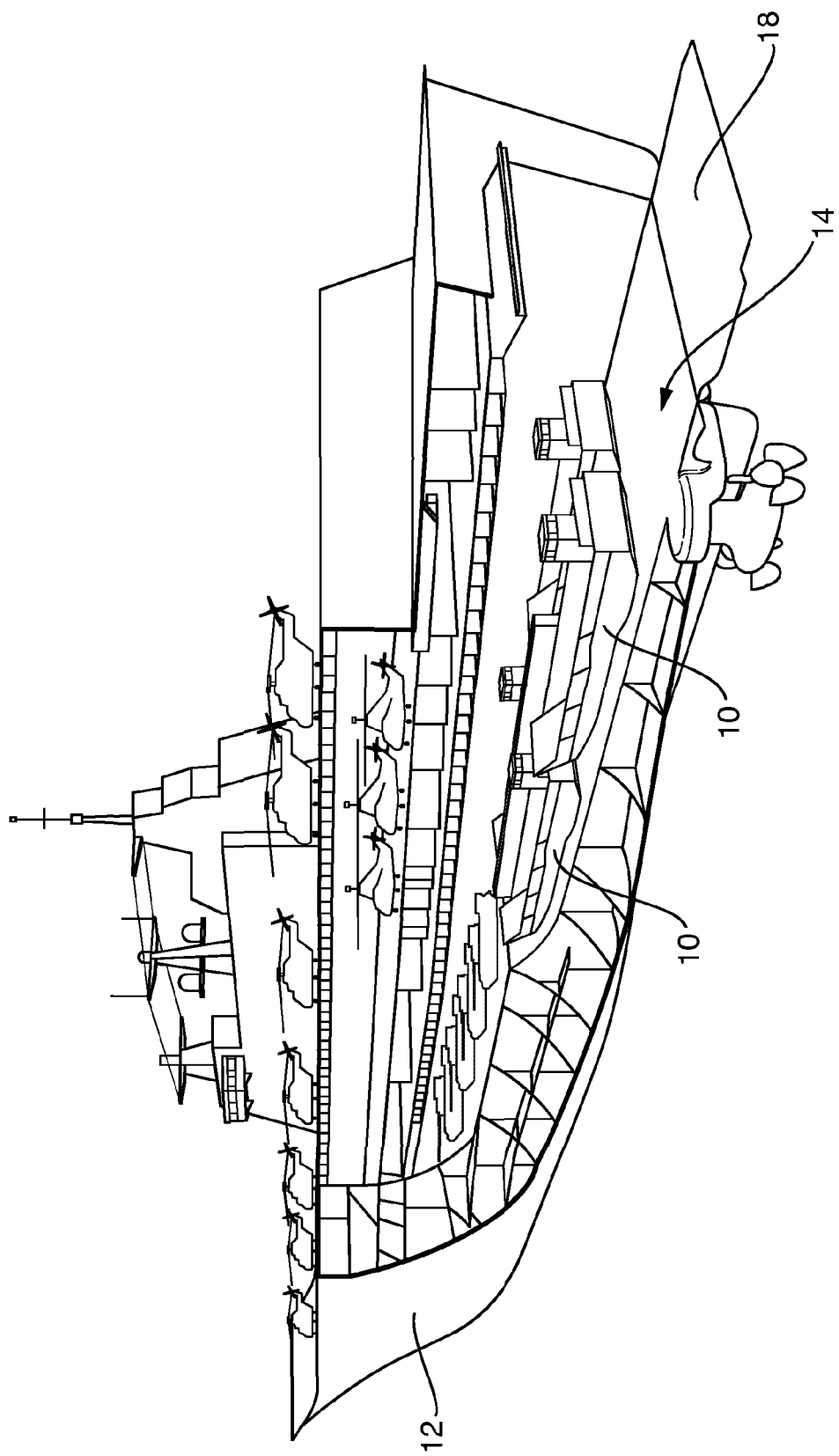
FIG. 2 is a part cutaway view through a host vessel of the type of FIG. 1.

Referring initially to FIG. 1, the apparatus of this invention is designed to assist the launch and recovery of smaller craft such as landing craft utilities (LCUs) 10 from a host vessel such as an amphibious warfare vessel or landing platform dock (LPD) 12 having a well dock 14. As seen in FIG. 1, the LPD carries both helicopters 16 and LCUs 10 for offloading personnel, land vehicles and other supplies and equipment from the LPD.

The ship is provided with an internal well dock 14 in which are stored a number of LCUs 10. During normal operation the well dock 14 is dry and the LCUs rest on the base of the well dock. When however it is wished to launch the LCUs, the well dock is lowered by introducing water into ballast tanks (not shown) in the LPD 12 so as to lower the stern portion of the ship, and a stern door 18 is opened so that the well dock is flooded, with the LCUs 10 then floating within the well dock. Once the door 18 is open the LCUs can dock and undock from the well dock to make the trip to shore and back.

We have found that the water state in the well dock area can vary considerably dependent on parameters that relate to the external environment of the ship, as well as to parameters relating to the ship itself. In practice, it is difficult to influence the external factors but we have found that, by careful control of the ship parameters it is possible to significantly improve the water conditions in the well dock.

Figure 3:
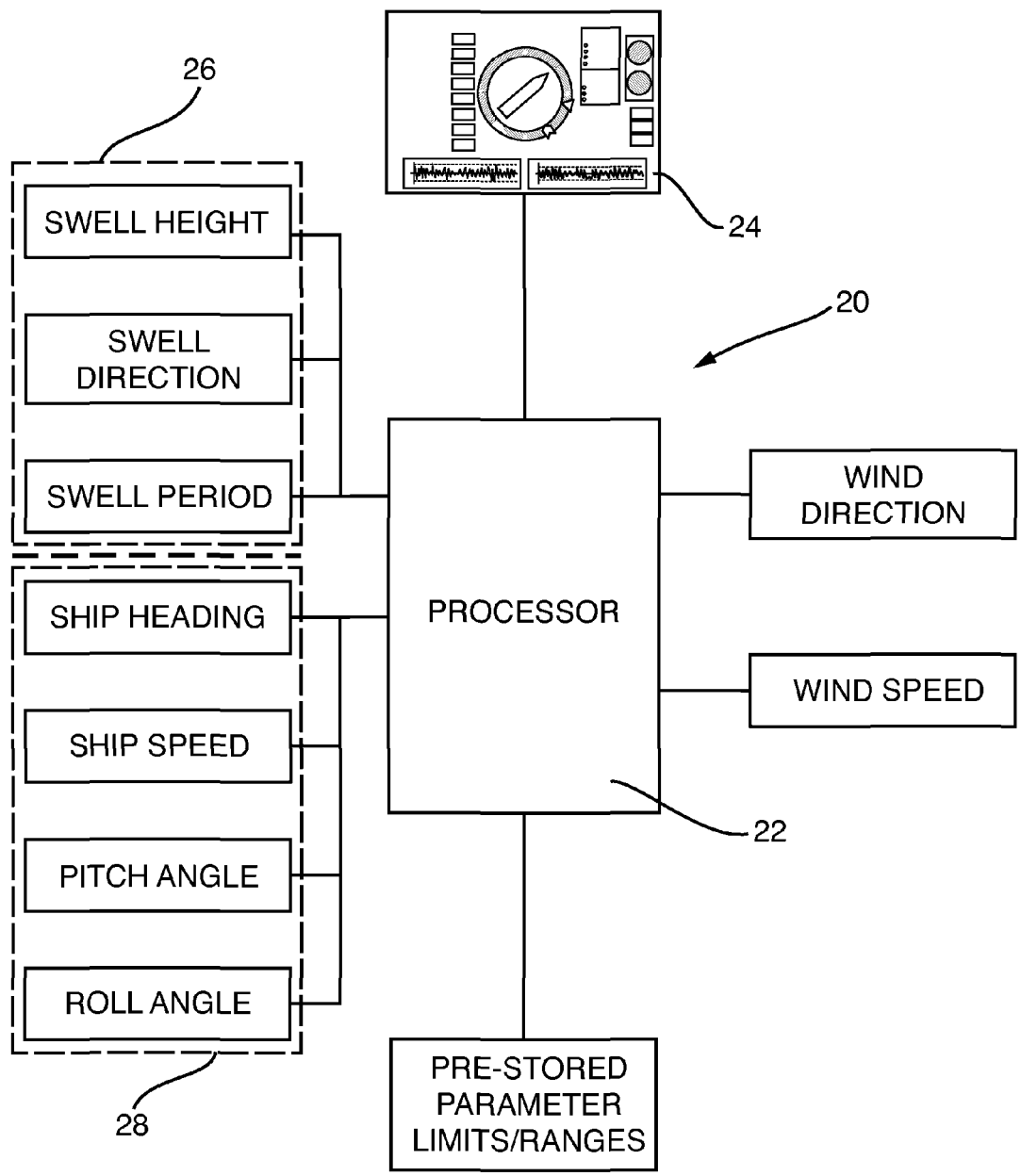
FIG. 3 is a schematic view of an offloading guidance system for use on board or in connection with the LPD of FIGS. 1 and 2.

Referring now to FIG. 3, the LPD is equipped with an offload guidance system 20 which comprises a main processor 22 which receives inputs relating to the environmental factors and inputs relating to the ship parameters, compares these with preset values and provides an indication on an external display 24 of the suitability of the conditions for launch and recovery of vehicles from the well dock 14. Specifically, a wave buoy 26 obtains accurate sea state data and processes these to provide indications of the swell height, true swell direction and swell period. Instead of using a wave buoy, data relating to the swell may be obtained or derived from other sources, such as e.g. by x-band radar measurement. When monitoring sea state we have found that it is important to differentiate between a longer period swell component, and the shorter periods components that are wind driven, as it is the direction of the longer swell period that has a much more significant influence. Accordingly the wave buoy 26 processes the raw data in known fashion to determine the true direction of the longer swell period and supplies this to the processor 22.

The outputs of each of these sensors are supplied to the central processor. Also supplied to the central processor are signals from the ship's navigation system or sensors 28 representative of the ship heading and the ship speed. The processor compares these various values with predetermined limits and ranges for the respective parameters and/or other sensed parameters as set out in the following table. In the case of the ship heading it will be noted that an acceptable range for this is determined in terms of an allowable range of deviation from the direction of the longer period swell.

| Parameter | Acceptable range |
|---|---|
| Swell height | 0-1.8 m |
| Ship heading | ±60° relative to swell |
| Ship speed | 0-5 kts |
| Roll angle | ±1.0° |
| Pitch angle | ±0.5° |

Figure 4:
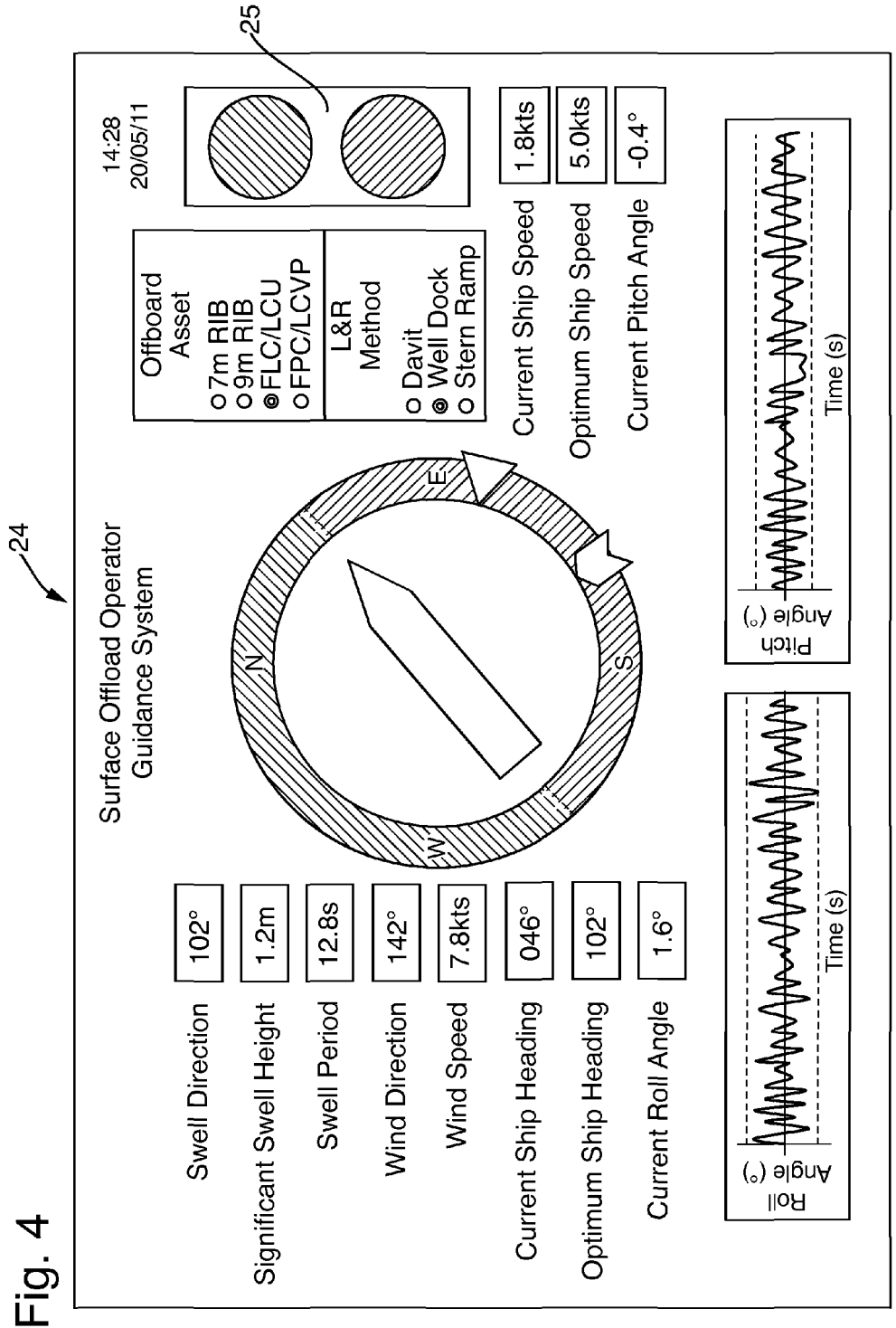
FIG. 4 is a view of a display for the arrangement of FIG. 3.

The processor 22 outputs a 'GO' signal provided that all the parameters are within the ranges as set out in the table above. The 'GO/NO GO' signal is displayed on the display 24 as a red or green 'traffic light' 25. The display is shown in greater detail in FIG. 4. Also reproduced on the display 24 are the numeric values of the swell direction, the swell height and the swell period, along with the wind direction, the wind speed, the ship current heading, the current ship speed and current roll and pitch angles. The roll and pitch angles are also displayed as an extended time trace for a period of say 2 minutes along with allowable limit bands. In this way the roll and pitch behaviour can be observed and flagged if it exceeds the predetermined range.

In addition to the detected values as mentioned above, the display also displays values for optimum ship heading and optimum ship speed. In this embodiment, the optimum ship heading is made equivalent to the swell direction. Empirical studies conducted by the applicants indicate heading the ship into the direction of the swell provides improved conditions. The optimum ship speed given is the minimum acceptable speed of the ship. The value for the optimum ship speed may be readily determined empirically for particular combinations of the current ship heading and the measured swell conditions, based on trials data.

In general data may be captured for particular combinations of internal and external conditions and types of smaller craft and launch/recovery methods and the processor may process the input data using suitable adaptive processing such as by a neural network to adjust the monitoring steps to provide an improved estimation of the suitability of the water conditions for launch and recovery of the various smaller craft for different launch and recovery methods, such as by davit, from the well dock, or off the stern ramp.

The display 24 also includes a central compass area where the current ship heading, the optimum ship heading and the wind direction are displayed. The display also shows the current launch and recovery method (davit, well dock, stern ramp) as well as the nature of the smaller craft being deployed.

The invention claimed is:

1. An apparatus for providing an indication of a suitability of water conditions in a launch/recovery zone for launch or recovery of a smaller craft from or to a host ship, the apparatus comprising:
   one or more sensors for detecting one or more parameters relating to an external environment of the host ship including:
      swell height;
      swell direction; and
      swell period;
   one or more sensors for detecting one or more parameters relating to the host ship including:
      current ship heading;
      current ship speed;
      ship pitch angle;
      ship roll angle; and
   a processor for receiving and processing the one or more detected parameters relating to the external environment of the host ship and the one or more detected parameters relating to the host ship, and for providing a signal indicative of the suitability of the water conditions in said launch/recovery zone.

2. The apparatus according to claim 1, wherein said processing includes comparing at least some of the one or more detected parameters relating to the external environment of the host ship and the one or more detected parameters relating to the host ship with pre-stored data comprising at least one of respective limit values, and respective value ranges.

3. The apparatus according to claim 1, wherein said host ship comprises a well dock incorporating said launch/recovery zone, and wherein said processor is operable to provide an indication of the suitability of the water conditions in said well dock for the launch and/or recovery of a smaller craft.

4. The apparatus according to claim 1, wherein said host ship includes a stern ramp defining said launch/recovery zone, and wherein said processor is operable to provide an indication of the suitability of the water conditions on or adjacent to said stern ramp.

5. The apparatus according to claim 1, wherein said host ship is adapted to allow launch and/or recovery of smaller craft overboard from or to a launch/recovery zone adjacent said host ship, and wherein said processor is operable to provide an indication of the suitability of the water conditions in said launch/recovery zone.

6. The apparatus according to claim 1, wherein said processor is operable to provide a two state output signal representing a 'GO' or 'NO GO' indication.

7. The apparatus according to claim 1, including an indicator responsive to said signal for providing a visual indication of the suitability of said water conditions.

8. The apparatus according to claim 7, wherein said indicator provides an indication of at least some of the one or more detected parameters relating to the external environment of the host ship and the one or more detected parameters relating to the host ship.

9. The apparatus according to claim 7, wherein said indicator provides an indication of a variation with time of at least some of the one or more detected parameters relating to the external environment of the host ship and the one or more detected parameters relating to the host ship.

10. The apparatus according to claim 7, wherein said indicator provides an indication of which of the one or more detected parameters relating to the external environment of the host ship and the one or more detected parameters relating to the host ship have passed a preset limit or are out of a preset range.

11. The apparatus according to claim 1, wherein said processor is operable to output data for display on said indicator representing a suggested heading for said host ship to provide beneficial conditions in said launch/recovery zone.

12. The apparatus according to claim 1, wherein said processor is operable to determine a suggested minimum speed for the host ship.

13. The apparatus according to claim 1, wherein the processor is configured to provide a 'GO' indication while:
   the swell height is between 0 and 1.8 meters;
   the current ship heading is ±60° relative to a swell;
   the current ship speed is between 0 and 5 knots;
   the ship roll angle is ±1.0°; and
   the ship pitch angle is ±0.5°.

14. An apparatus for providing data representing a prediction of a suitability of water conditions for launch or recovery of a smaller craft from or to a host ship in a launch/recovery zone, the apparatus comprising:
   one or more sensors for providing data representing one or more given parameters relating to an external environment of the host ship including:
      swell height;
      swell direction; and
      swell period;
   one or more sensors for providing data representing one or more given parameters relating to operating conditions of the host ship including:
      current ship heading;
      current ship speed;
      ship pitch angle;
      ship roll angle; and
   a processor for receiving and processing said data representing the one or more given parameters relating to an external environment of the host ship and the one or more given parameters relating to operating conditions of the host ship from said one or more sensors, and for providing a signal indicative of the predicted suitability of the conditions in said launch/recovery zone.

15. A method for determining or predicting a suitability of water conditions in a launch/recovery zone within or adjacent a host ship, the method comprising:
   monitoring and processing one or more parameters related to an external environment of the host ship including:
      swell height;
      swell direction; and
      swell period; and
   monitoring and processing one or more parameters relating to the host ship including:
      current ship heading;
      current ship speed;
      ship pitch angle; and
      ship roll angle;
   thereby obtaining an indication of the suitability of the water conditions in said launch/recovery zone dependent upon said monitoring and comparison.

16. The apparatus according to claim 1, wherein said one or more sensors for detecting the one or more parameters relating to the external environment of the host ship comprise a wave buoy.

17. The apparatus according to claim 1, wherein said one or more sensors for detecting the one or more parameters relating to the external environment of the host ship are configured to detect those parameters using x-band radar measurement.

18. The apparatus according to claim 1, wherein at least some of said one or more sensors for detecting the one or more parameters relating to the host ship are included in a navigation system of the host ship.

19. The apparatus according to claim 14, wherein said one or more sensors for providing the data representing the one or more given parameters relating to the external environment of the host ship comprise a wave buoy, and at least some of said one or more sensors for providing the data representing the one or more given parameters relating to operating conditions of the host ship are included in a navigation system of the host ship.

20. The apparatus according to claim 14, wherein said one or more sensors for providing the data representing the one or more given parameters relating to the external environment of the host ship are configured to use x-band radar measurement, and at least some of said one or more sensors for providing the data representing the one or more given parameters relating to operating conditions of the host ship are included in a navigation system of the host ship.

* * * * *